L. LANGNER.
ENGINE STARTING DEVICE.
APPLICATION FILED JULY 21, 1913.

1,273,880.

Patented July 30, 1918.

Witnesses
Inventor
Lawrence Langner
By Kerr, Page, Cooper & Hayward
Attorneys.

UNITED STATES PATENT OFFICE.

LAWRENCE LANGNER, OF WHITESTONE LANDING, NEW YORK, ASSIGNOR TO THE DAYTON ENGINEERING LABORATORIES COMPANY, A CORPORATION OF OHIO.

ENGINE STARTING DEVICE.

1,273,880.

Specification of Letters Patent.

Patented July 30, 1918.

Application filed July 21, 1913. Serial No. 780,256.

*To all whom it may concern:*

Be it known that I, LAWRENCE LANGNER, a subject of the King of Great Britain, residing at Whitestone Landing, Long Island, State of New York, have invented certain new and useful Improvements in Engine Starting Devices, of which the following is a full, clear, and exact description.

This invention relates to improvements in starting systems for engines or the like and more particularly to improvements in starting systems for the internal combustion engines of automobiles, motor vehicles, etc.

The object of the invention is to prevent the improper actuation of the starting device and the consequent injury to the apparatus, and to avoid the possibility of accidents.

In accordance with one feature of my invention, I so arrange that the starting device cannot start to work until it is connected with the engine. In applying my invention to starting systems in which a friction transmission is employed between the starting device and the engine, I so arrange that the starting device cannot begin to work until there is sufficient friction between the friction transmission members to insure that no slip shall take place between them. I also so arrange that it shall not be possible to start the starting motor and then throw in the friction transmission, in order that the starting motor will always start under load and will receive no shock as would otherwise be the case if it were first started and coupled with the engine subsequently.

A preferred form of the invention as applied to an electrically operated starting device is illustrated in the accompanying drawings, in which:—

Figure 1:
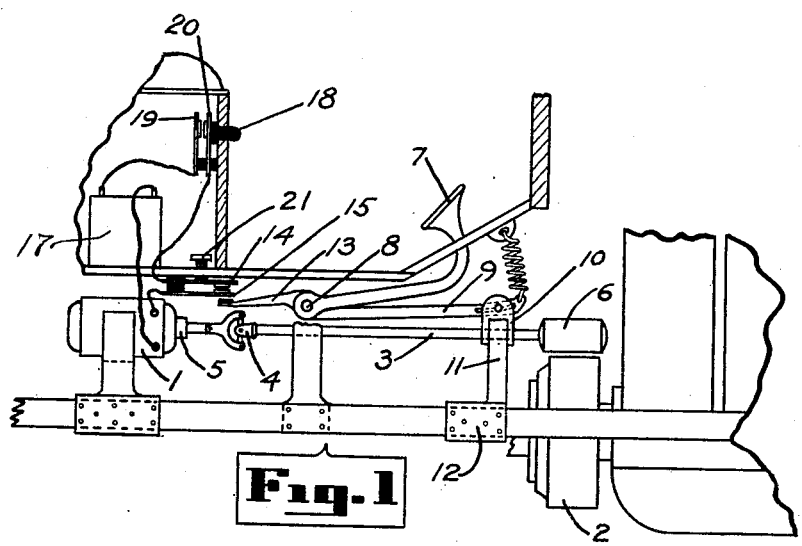
Figure 2:
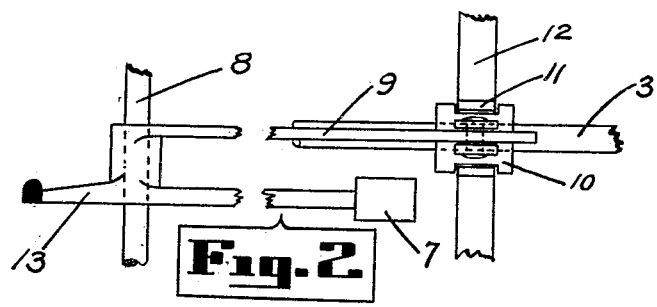

Figure 1 is a fragmentary side elevation showing the starting device mounted on the chassis of an automobile, and, Fig. 2 is a plan view of the controlling mechanism of the starting device on a larger scale.

Referring to Fig. 1, the starting device 1, preferably consisting of a series wound dynamo-electric-machine, is adapted to rotate the engine fly-wheel 2 through the transmission shaft 3, connected to the starting device through the universal joint 4 and roller clutch 5, and carrying in proximity to the periphery of the fly-wheel, a cylindrical friction member 6 made of hard rubber, canvas or any other suitable material or mixture of materials.

The aforesaid transmission mechanism is controlled by the foot pedal 7, pivoted on the shaft 8, and carrying the lever arm 9, the free end of which engages with a movable journal 10, in which said shaft 3 is journaled, said journal being guided for vertical movement by suitable guides 11, mounted on the cross bar 12. It will be obvious that upon the depression of the pedal, the lever arm 9 will depress the journal 10 and consequently force the friction member 6 strongly against the fly-wheel.

The pedal system just described is so proportioned that when the pedal is fully depressed, sufficient leverage is secured to insure that no slip takes place between the friction member and the fly-wheel when the starting device is running.

A short lever arm 13 extends from the hub of the pedal, and is adapted, when the pedal is fully depressed, to close electrical contacts 14, 15 arranged in the circuit between the battery 17 and the starting device. A push button 18 also controls a second pair of contacts 19, 20 arranged in said circuit. Upon depressing the starting pedal to its fullest extent, the friction member is brought into contact with the fly-wheel with the requisite degree of friction and the contacts 14, 15 are simultaneously closed by the short lever arm 13; the push button 18 is then depressed and current flows from the battery into the starting device, causing the operation of said starting device and the consequent starting of the engine, through said friction drive.

It will be understood from the foregoing that if the driver does not depress the pedal sufficiently, the starting device cannot operate upon depression of the push button 18, as the contacts 14, 15 will be open. Furthermore, it will be impossible to cause an initial operation of the starting device by actuating the push button 18, and then to connect the starting device with the engine. A set screw 21 serves for adjusting the contact member 14.

It will be understood that the present invention is capable of various modifications both as to the various units and combinations of units comprising said invention in accordance with the scope of the claims appended hereto.

While the form of mechanism herein shown and described constitutes a preferred form or embodiment of the invention, it is to be understood that other forms might be adopted, all coming within the scope of the claims which follow.

What I claim is:

1. An engine starting system comprising in combination with an engine, a starting device, a normally dis-established connection between the starting device and the engine, a manually actuated controlling member operative solely for controlling the rotation of the starting device, a separate manually actuated controlling member adapted to establish or dis-establish said connection, and means for rendering the first named controlling member ineffective until said second named controlling member has been actuated.

2. An engine starting system comprising in combination with an engine, an electric motor, a battery, normally open electrical conections between said motor and battery, normally dis-established mechanical connection between said motor and engine, an operating member for establishing said mechanical connection and closing part of said electrical connections, and a circuit controlling member operative solely for completing the closing of said electric connections.

In testimony whereof I affix my signature in the presence of two subscribing witnesses.

LAWRENCE LANGNER.

Witnesses:
J. W. McDONALD,
WALTER W. RIEDEL.

Copies of this patent may be obtained for five cents each, by addressing the "Commissioner of Patents, Washington, D. C."